July 20, 1954  J. A. PERRY  2,684,214
AIRPLANE STRUCTURE
Filed Oct. 15, 1951
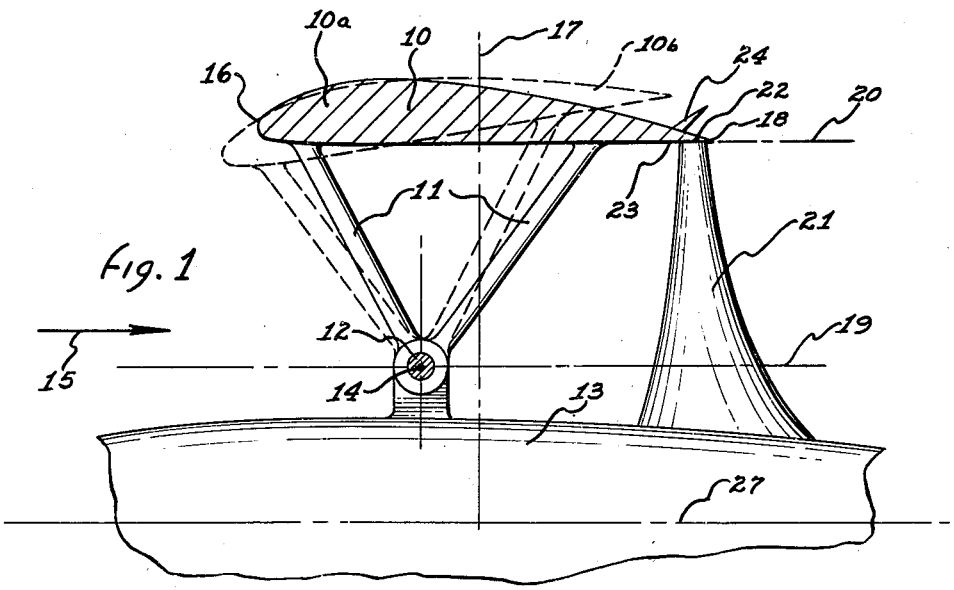
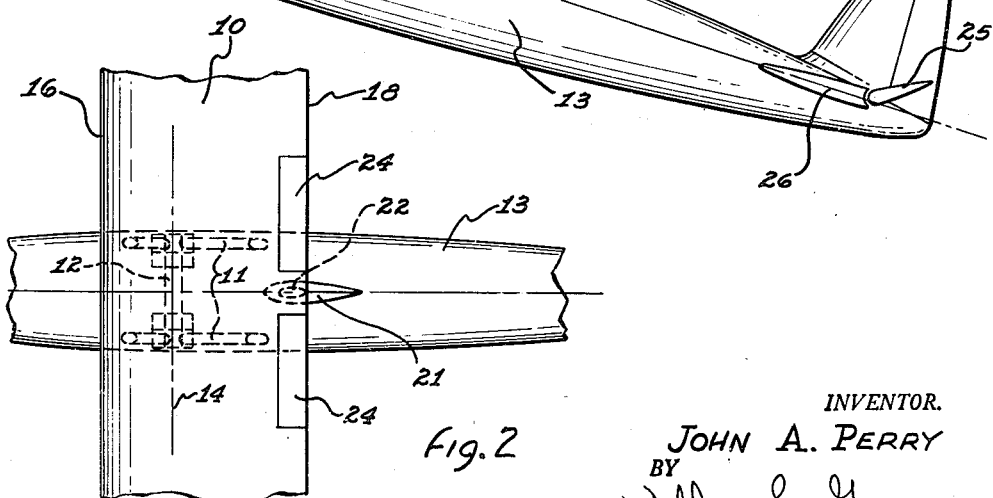
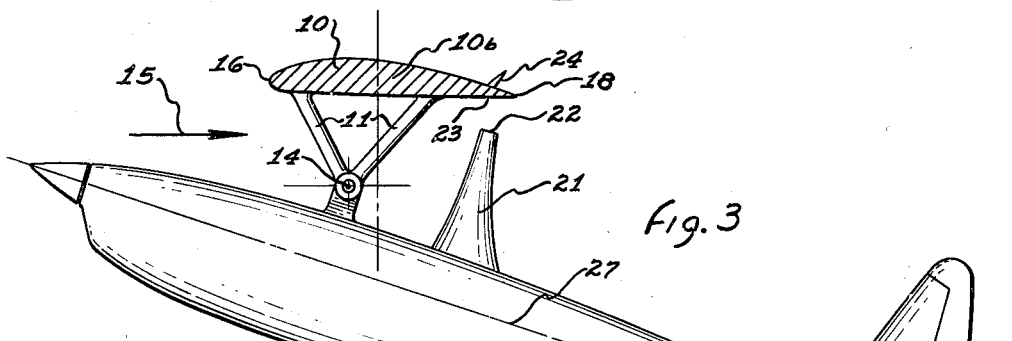
INVENTOR.
JOHN A. PERRY
BY
Willard S. Groen
ATTORNEY.

Patented July 20, 1954

2,684,214

UNITED STATES PATENT OFFICE 2,684,214

AIRPLANE STRUCTURE

John A. Perry, Phoenix, Ariz.

Application October 15, 1951, Serial No. 251,302

4 Claims. (Cl. 244—48)

This invention pertains to improvements in aeroplane structures and is particularly directed to improvements in the lifting and sustaining wing structure for aircraft.

One of the objects of this invention is to provide an improved airfoil section for an airplane which is pivotally mounted relative to the load or fuselage of the plane so as to automatically adjust its lift and drag with respect to the air flow as determined by the forward speed of the plane so as to automatically compensate for variations in the plane speed, air density, and erratic manipulation of the plane by the aviator.

Another object of this invention is to provide an improved airfoil section for an airplane wing which is pivotally mounted to the frame or fuselage of the plane for swinging movement about an axis lying horizontal to the normal line of level flight and transverse to the direction of flight of the plane and in which structure there is provided a stop means for limiting pivotal movement of said wing on the fuselage.

Still another object of this invention is to provide an improved airplane lifting wing structure having a pivotal mounting for the wing located about a horizontal transverse axis on the fuselage of the plane and to provide stop means interacting between the fuselage and the wing to limit the swinging movement of said wing structure to predetermined limits of movement.

Still another object of this invention is to provide an improved lifting wing for an aircraft having a pivotal mounting about a horizontal axis on the fuselage of the plane, said axis lying toward the leading edge of the airfoil section of the pivotally mounted wing and including a stop means interacting between the fuselage and the wing for limiting rearward swinging movement of said wing relative to the fuselage.

And still another object of this invention is to provide a swinging wing structure for an aircraft having an airfoil section that is pivotally mounted to one side of said airfoil section and at a point more closely related to the leading edge than the trailing edge of said airfoil section, said pivotal mounting being connected to the load or fuselage of the member being carried and in which there is a stop means mounted on the fuselage and engaging the wing structure to limit its rearward swinging movement to predetermined positions.

Still another object of this invention is to provide an improved pivotally mounted airfoil wing section for an airplane which is mounted for longitudinal swinging movement about a transverse axis on the fuselage of the plane and in which arrangement there is provided a stop means for limiting said pivotal swinging movement to predetermined positions in conjunction with tab means on the wing structure for normally biasing the pivotal movement of said wing against said stop means.

Further features and advantages of this invention will appear from a detailed description of the drawings in which:

Fig. 1 is an enlarged fragmentary side elevation of an aircraft incorporating the features of this invention.

Fig. 2 is an enlarged fragmentary plan view of the subject matter shown in Fig. 1.

Fig. 3 is a side elevation of an aircraft operating under full stalled conditions illustrating the operation of this invention.

For exemplary purposes there is shown the conventional airfoil section or wing structure 10 which is connected by suitable supporting framework or struts 11 to a rock or pivot shaft 12 carried on the fuselage 13 of the aircraft, such structure being substantially like that shown in my co-pending patent application, Serial No. 201,378, filed December 18, 1950 and now abandoned. In this type of structure it is to be noted that the axis of swinging movement 14 about the shaft 12 is located toward the direction of air flow as indicated by the arrow 15 and therefore toward the leading edge 16 of the airfoil section 10 relative to a center line 17 located intermediate the leading edge 16 and the trailing edge 18. It is also to be noted that the axis 14 of pivoting is preferably below the wing section 10 by a distance of approximately one half the overall length of the airfoil section between the leading edge 16 and the trailing edge 18 as indicated by the distance between the lines 19 and 20.

Experience has shown that with increase of air speed, as indicated by the arrow 15, the wing structure above described moves counterclockwise as shown in Fig. 1 from a position 10a to a position 10b and that decreasing air speeds tend to cause the wing to again rock backwardly in a clockwise direction toward the position 10a. The position 10a in Fig. 1 is that position assumed under normal average air speed or flight conditions and excessive speed beyond this normal flight condition will cause the airfoil section 10 to move toward the position 10b to further decrease drag and lift and increase the efficiency of operation of the wing with increase speeds of the plane, all of said aforementioned rocking motion taking place automatically as the result of variations in air speed or density of the air thru which the plane is passing without attention or control upon the part of the operator.

In order to provide a limitation on the rearward rocking motion of the wing section in a clockwise direction as indicated in Fig. 1 there is provided a suitable stop means which in one form may comprise a vertically disposed post 21 rigidly fixed to the fuselage 13 of the plane in any suitable manner and having on its upper end an abutment surface 22 for engaging the undersurface 23 of the wing section 10 so that the backward swinging motion of the wing 10 is limited to a position such as the position 10a which would be determined for the normal flight characteristics of the plane. A suitable biasing tab 24 is fixed to the trailing edge of the wing section so as to cause the wing to normally swing backwardly under normal flight conditions to cause the surface 23 of the wing to remain in contact with the abutment surface 22 of the stop post 21.

Thus under normal flight conditions with the air speed indicated by the arrow 15 within the range of normal flight characteristics the wing will be held against the stop surface 22 of the post 21 so that in effect the wing 10 then functions as an ordinary standard rigid wing aircraft and performs and behaves in a manner commensurate therewith. Increase speed beyond the normal operating range however causes the wing to swing forwardly to a position such as that at 10b as discussed above to decrease lift and drag and improve the efficiency of the operation of the craft at high speed.

A still more important advantage of this structure, however, lies in the fact that not only does the plane function normally as a rigid wing craft but in the event a stalled condition was met or the plane improperly controlled in too steep a climb such as shown in Fig. 3 wherein the elevators 25 of the tail surfaces 26 are moved upwardly by the pilot in a steep climb to cause a full stall with the main axis of the fuselage 27 at a steep angle relative to the horizontal, the wing section 10 will move toward the position 10b as shown in Fig. 3 so as to still maintain the normal angle of attack of the wing 10 with the direction of air movement 15 and thereby prevent the wing from becoming inoperative as a lifting medium so that under these adverse operating conditions the pilot is automatically protected in the control of his craft without the craft going into an uncontrollable mushing down stalled condition which would happen if the angle of attack of the wing 10 remained parallel to the line 27 of the fuselage with regard to the forward movement 15 of the plane.

If therefore follows that in this structure applicant has devised an arrangement whereby stalling is substantially impossible even though the craft may be mishandled because of the fact that the fuselage and its axis 27 may be moved relative to the wing 10 so that the wing automatically remains in proper operating angle of attack with the line of air movement 15. It is to be further noted that in normal flight the wing becomes relatively locked out or rigid with respect to the craft as in a normal rigid wing aircraft to provide normal operating conditions for the plane.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendend claims are intended to be included herein.

Having thus fully set forth and described this invention what is claimed is:

1. An aeroplane structure including a fuselage, a supporting wing, a pivotal connection freely rotatable about a transverse axis on said fuselage, supporting strut means mounted on said pivotal connection extending upwardly and rigidly connected to said wing for forward and rearward swinging movement of said wing on said fuselage, an abutment surface fixed relative to said fuselage, and an abutment surface fixed relative to said wing adapted to engage said first mentioned abutment surface to stop rearward swinging movement of said wing on said fuselage to a position assumed by the wing under normal average air speed flight conditions.

2. An aeroplane structure including a fuselage, a supporting wing, a pivotal connection freely rotatable about a transverse axis on said fuselage, supporting strut means mounted on said pivotal connection extending upwardly and rigidly connected to said wing for forward and rearward swinging movement of said wing on said fuselage, an abutment surface fixed relative to said fuselage, an abutment surface fixed relative to said wing adapted to engage said first mentioned abutment surface to stop rearward swinging movement of said wing on said fuselage to a predetermined position, and tab means on the upper surface of said wing closely adjacent the trailing edge thereof to cause said wing to be biased in a backward swinging position of engagement of said abutment surfaces during normal flight conditions for said aircraft.

3. An aeroplane structure including a fuselage, a supporting wing, a pivotal connection freely rotatable about a spanwise axis substantially transverse to the fuselage of said aeroplane, strut support means carried on said pivotal connection extending upwardly and rigidly connected to the underside of said wing, an abutment stop post fixed to said fuselage under said wing, and an upwardly facing abutment surface on top of said post located so as to engage the under side of said wing at a point immediately in front of the trailing edge of said wing to arrest pivotal movement of said wing in the direction of increased angle of attack to a position assumed by said wing under normal average air speed flight conditions.

4. In an aeroplane structure, a fuselage, a wing, load carrying strut means fixed to and depending downwardly from the under side of said wing, means for pivotally mounting the lower portions of said strut means for free forward and rearward swinging movement on said fuselage about a spanwise axis substantially transverse to the fuselage of said airplane, tab means on the top surface of said wing located adjacent the trailing edge of said wing to bias said wing in rearward swinging movement on said fuselage, and an abutment surface fixed on said fuselage engaging the under side of said wing adjacent said trailing edge to positively limit said rearward swinging movement of said wing.

References Cited in the file of this patent

UNITED STATES PATENTS

| Number | Name | Date |
| --- | --- | --- |
| 1,127,167 | Biais et al. | Feb. 2, 1915 |
| 1,130,125 | Wilkins | Mar. 2, 1915 |
| 1,306,002 | Gettemy, Jr. | June 10, 1919 |
| 1,435,848 | Huffaker et al. | Nov. 14, 1922 |
| 1,478,270 | Trunko | Dec. 18, 1923 |
| 1,844,448 | Sramek | Feb. 9, 1932 |
| 2,082,172 | Mignet | June 1, 1937 |
| 2,428,194 | Bockrath | Sept. 30, 1947 |
| 2,623,712 | Spratt | Dec. 30, 1952 |